United States Patent [19]

Tall et al.

[11] 3,797,719

[45] Mar. 19, 1974

[54] APPARATUS FOR BURSTING SECTIONALIZED ELONGATED STRIPS

[76] Inventors: Leonard H. Tall, 6308 S.E. 22nd St., Mercer Island, Wash. 98040; Paul A. Catlstedt, 9055 Phinney Ave. North, Seattle, Wash. 98103; Arlen J. Erickson, 211 N.W. 62nd St., Seattle, Wash. 98107

[22] Filed: Dec. 6, 1972

[21] Appl. No.: 312,714

Related U.S. Application Data

[62] Division of Ser. No. 133,885, April 14, 1971.

[52] U.S. Cl. .............................. 225/100, 225/106
[51] Int. Cl. ........................................ B65h 35/10
[58] Field of Search .................. 225/4, 5, 100, 106

[56] References Cited
UNITED STATES PATENTS
1,072,055   9/1913   Straight .............................. 225/100
3,507,429   4/1970   Cunningham et al ........... 225/100 X
3,741,451   6/1973   Parenti et al ....................... 225/100

Primary Examiner—Frank T. Yost
Attorney, Agent, or Firm—Christensen, O'Connor, Garrison & Havelka

[57] ABSTRACT

A bursting apparatus in which a first stretch of feed chain advances a carrier stock to a loading station and a second stretch advances the loaded section of carrier stock beyond the loading station where it is torn from the body of the carrier by effecting relatively longitudinal movement between the chain stretches preferably along a preformed score line. Positive engagement of pins on the feed chain with holes in the carrier stock permits feeding and tearing off the sections successively.

2 Claims, 14 Drawing Figures

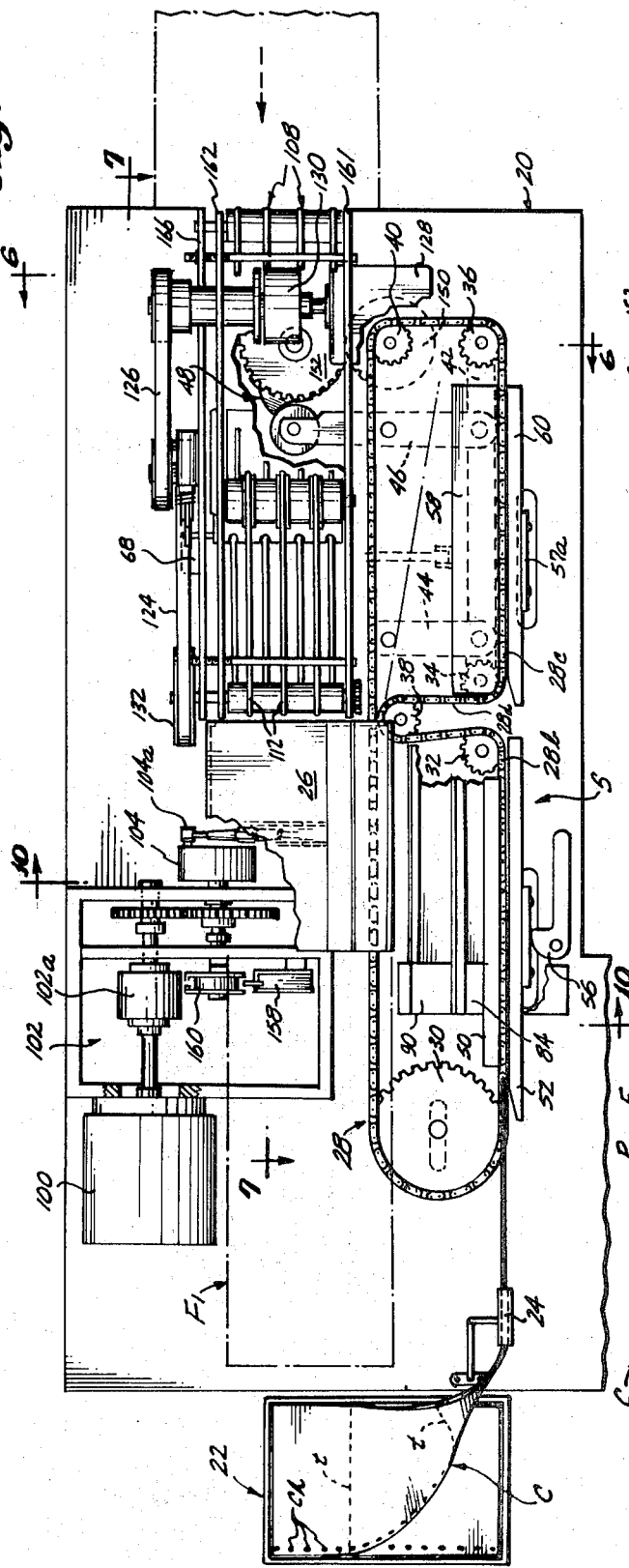

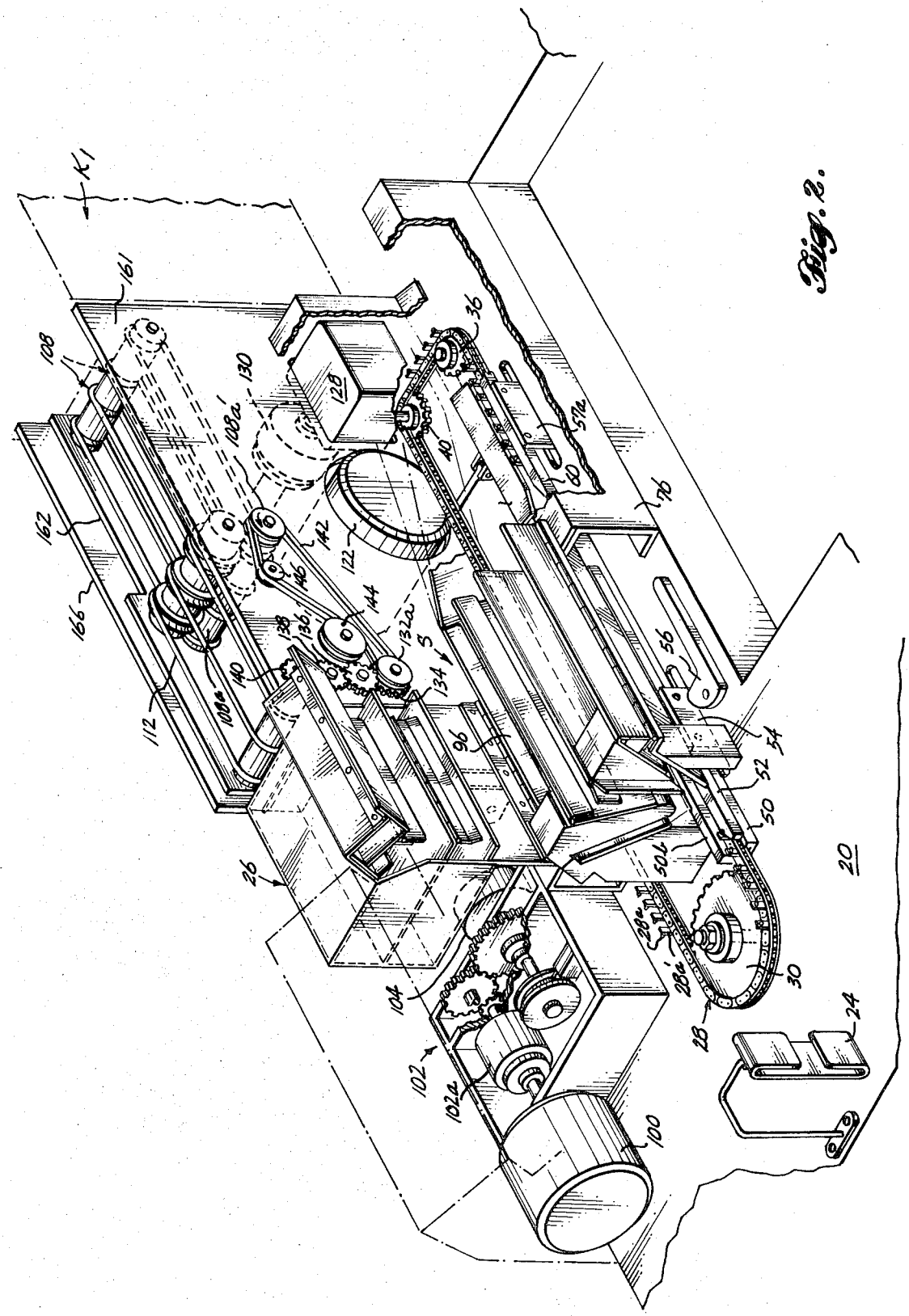

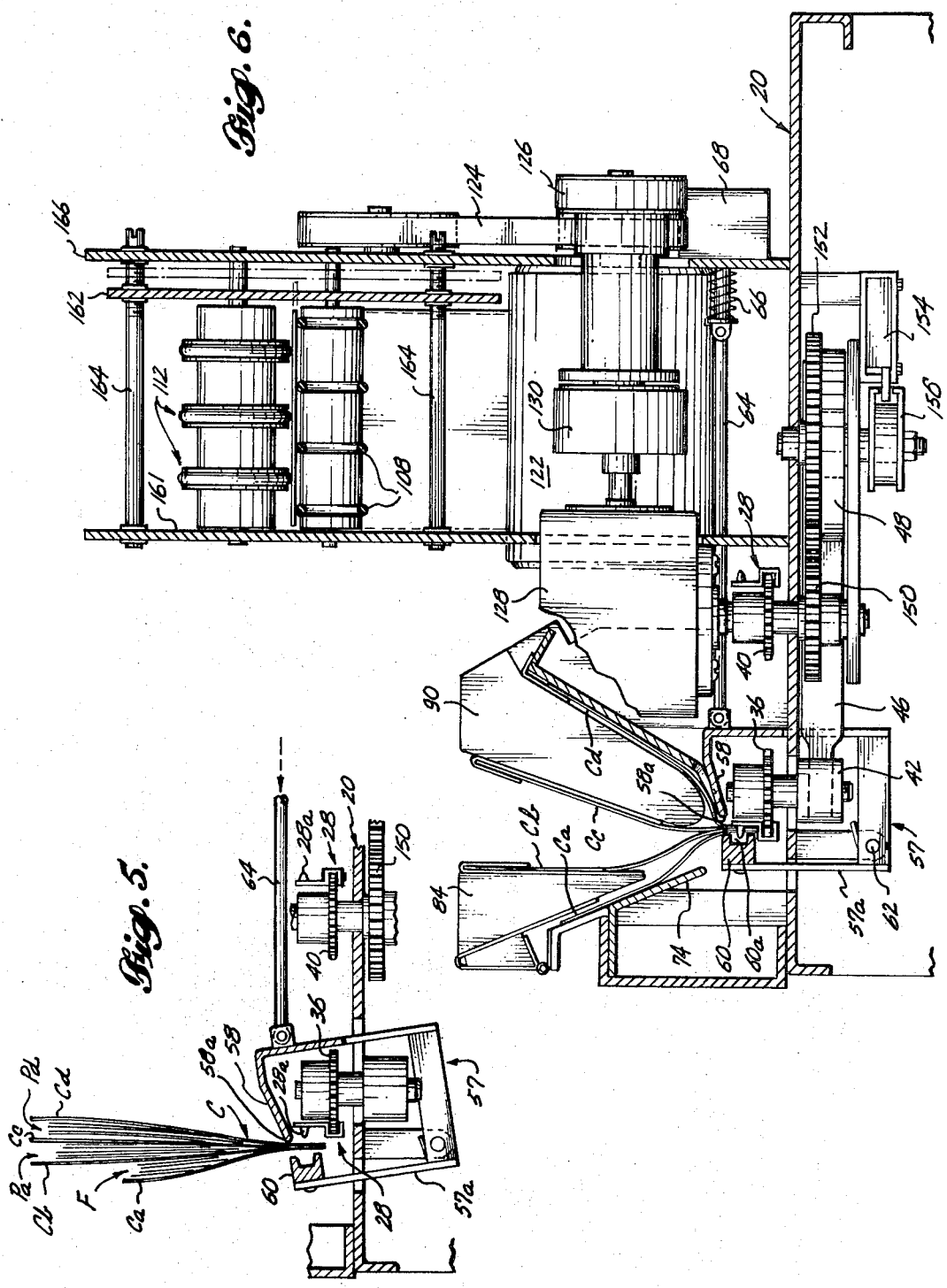

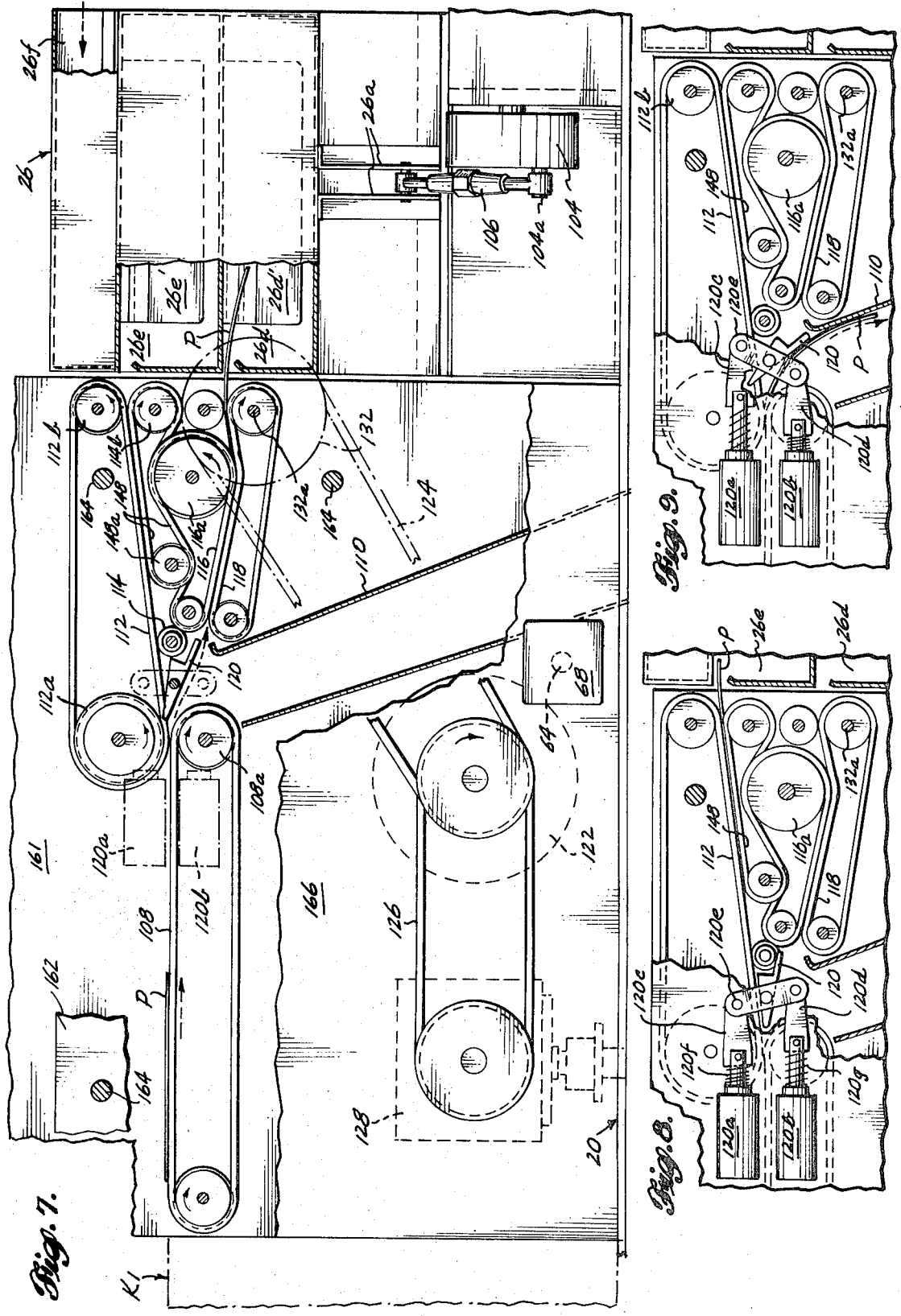

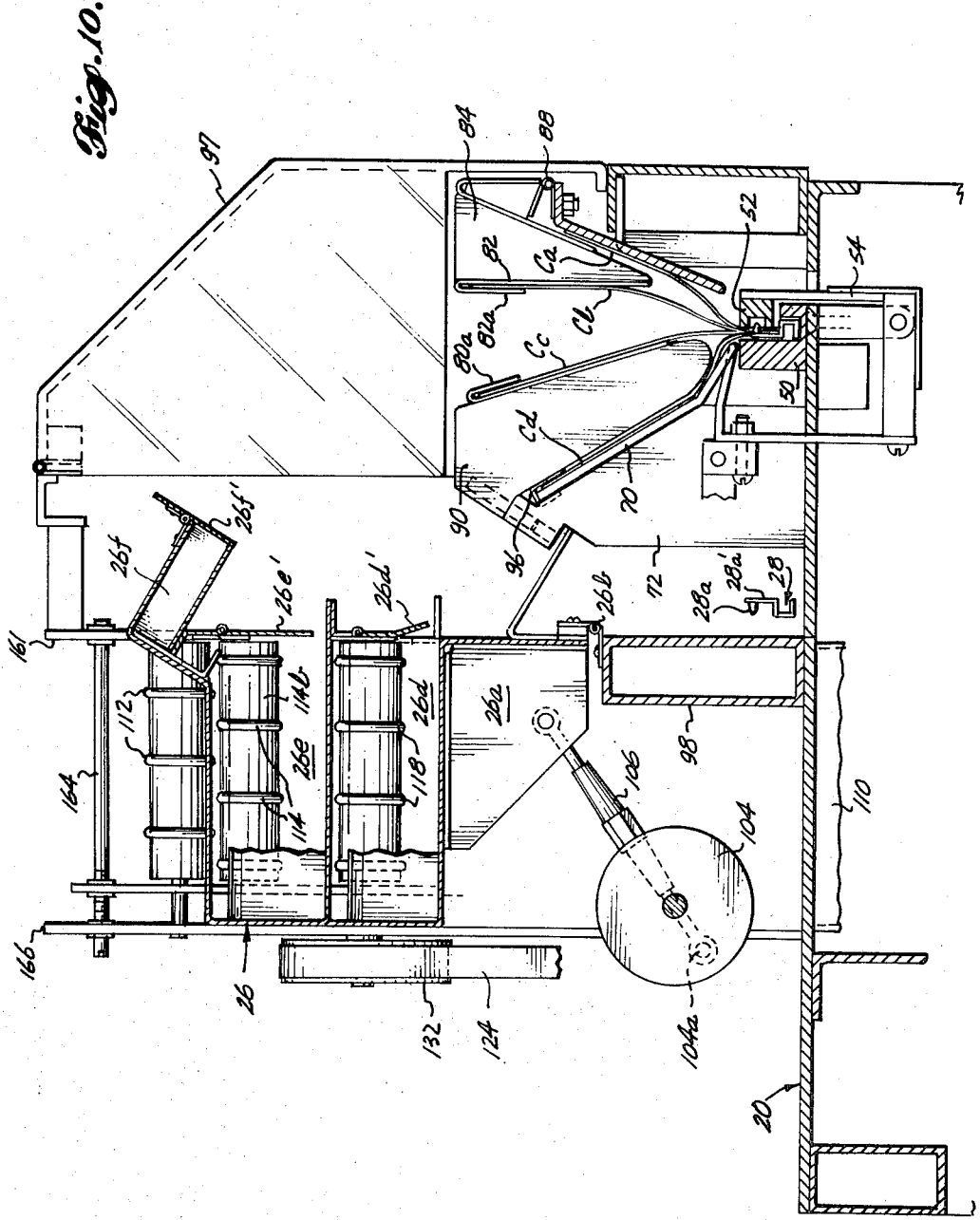

APPARATUS FOR BURSTING SECTIONALIZED ELONGATED STRIPS

BACKGROUND

This application is a division of Ser. No. 133,885, filed Apr. 14, 1971.

This invention relates to improvements in techniques used in commercial photographic processing laboratories for sorting, packaging and handling of prints and films making up individual customer orders. The invention is herein illustratively described by reference to the presently preferred embodiment thereof; however, it will be recognized that certain modifications and changes therein with respect to details may be made without departing from the essential features involved.

Processing costs in such establishments have been higher than feasible and the errors of incorrectly grouped or lost photographs (i.e.., prints and/or negatives) a serious problem. With the large number of films and prints which must be sorted, packed, priced, reprocessed if needed, and handled largely altogether by human effort on a mass production, competitive basis, it is understandable that such errors and inefficiencies may and do exist under current practices. Satisfactory mechanized techniques for grade-sorting, packaging, pricing and handling the items in a system which maintains customer order groupings, allows for unhurried preliminary inspection and grading, and delivers a packaged order ready and identified for delivery and/or for any interim further processing of make-over work represents a broad object of this invention.

In order to achieve the stated objectives, therefore, the invention provides among other features an improved mark-controlled sorting and packaging machine and method as well as a related pricing technique which is compactly organized and requires minimum operator attention or control. Moreover, it is an object to devise such apparatus as will be compatible with related commercially available equipment such as machines for cutting and feeding films and prints grouped by customer order.

A related object of the invention is to devise apparatus and techniques utilizing, improving and extending the teachings of copending application Ser. No. 120,551, filed Mar. 3, 1971, by Leonard H. Tall and Arlen J. Erickson, entitled PROCESSOR'S METHOD AND APPARATUS FOR PACKING PHOTOGRAPHS, AND CARRIER MEANS USED THEREIN.

A further object of this invention is to devise a machine and method for sorting and packing cut prints initially stored on a continuous roll of prints making up numerous customer orders and fed through a suitable or commercially available print cutting and customer-order segregating apparatus such as one of the Series 5k paper cutters produced by Eastman Kodak Company of Rochester, New York. More specifically herein it is an object to devise an efficient and reliable photosensing method and related apparatus compatible with a machine of this general type, using a color coded marking scheme wherein grade marks easily penciled on the print margins by an inspector are distinguished photoelectrically from any color used in the print cutting and end-of-order marks of the print cutter; also from changes in general light conditions. It is an object to enable incorporating such print cutting apparatus in the packing and sorting machine of this invention together with suitable or commercially available equipment for feeding cut negatives or films associated in the same customer order with the respective prints and to be packed with them for delivery to the customer and/or further processing.

A related object is to devise a photosensing control for sorting prints with a simple memory arrangement having stages permitting high rates of feed of the prints being sorted.

Still another object hereof is to devise a processor's pricing system and technique by which, with simple apparatus additions using available pricing computer technology and photoelectrically available signals from the photosensor associated with the sorting function of the present machine, price information is automatically provided for each customer order in conjunction with the sorting function of the apparatus automatically allowing any deductions for reject frames but including acceptable prints and remakables as well.

Still another purpose of this invention is to devise an efficient machine for mechanically sorting and holding cut films and/or prints making up a customer order, and mechanically loading the same into separate pockets in a protective carrier, wherein they will be retained separate for reprinting of one or more of the frames and/or for delivery to the customer. It is an important object to devise an efficient and simple loading mechanism for such a carrier overcoming the problems of inserting groups of prints simultaneously into awaiting narrow spaces between leaves of a paper-like carrier, with the prints often tending to curl up, catch on each other or present other handling difficulties. The novel mechanism assures rapid and positive insertion of the prints and negatives into the carrier pockets. A specific object to that end is to devise an open loader utilizing centrifugal force during its loading stroke to help compact the items and gravity assisted by momentum of the items as the stroke is completed to force the items from the loader and into the receiving carrier pockets.

Still another object of this invention is to devise a simple and effective arrangement by which to advance, spread and hold carrier stock generally of the character described so as to bring successive carrier-length sections thereof into a loading station wherein the leaves of the stock are spread to form the open receiving pockets into which the loader makes its deliveries. It is also an object to provide an effective means to automatically sever a loaded section of carrier from the succeeding body of carrier stock by tearing the stock along a transverse score line. A related objective hereof is to engage the carrier without slippage or damage both during feeding and during tearing of the stock in the successive operating stages of the machine. More specifically the invention utilizes the carrier stock feed mechanism itself to effect the severance operation, with attendant simplification of apparatus requirements and also as a means to facilitate tearing action by exerting tension in the stock starting at one edge.

The invention is further directed to a novel feed and diverter mechanism for mechanically directing photographic prints in positive rapid manner into selected compartments of an accumulating or storage loader and/or into a reject chute in accordance with grade marks applied to the prints. A related object is to provide compactly organized mechanism of this nature with associated means for feeding cut films and cut prints of an individual customer's order simultaneously to such a loader in association with means to feed carrier stock and perform other functions with respect to the carrier stock severed by the loader.

Other objects of the invention will appear from the illustrations and the detailed description which follows.

BRIEF DESCRIPTION OF INVENTION

In brief terms, the invention provides a means by which multiple-leaf paper-like carrier stock engaged by a first stretch of feed chain is fed endwise by section-length increments first to and then beyond a loading station adjoining a transversely reciprocative print segregating loader. In approaching the loading station the carrier stock moves past spreader-guide means operable to open up the leaves of the stock so as to form receiving pockets therebetween at the loading station. Prints and films of a customer order are deposited in stacks generally horizontally into the loader compartments which are respectively in line with the generally longitudinal feed paths extending from a print cutter machine and a negative cutter machine. The accumulated groups of prints and films are then swung laterally and downwardly through an arc of approximately 90 degrees which thrusts the prints and films edgewise downwardly into the respective open carrier pockets with the force of gravity assisted by momentum of the prints assuring their reliable full insertion down into convergently shaped and relatively narrow pockets, despite normal tendencies of the individual prints to curl and warp.

Thereafter, advanced by a second stretch of feed chain past the loading station, the now loaded section of carrier is severed from the carrier stock body by abrupt endwise shifting of such second stretch of feed chain longitudinally away from the first stretch. Drive pins on the chain engaging drive holes in the carrier stock assure that the carrier stock is held positively and thereby that both the feed and the severance effects are positive while avoiding carrier damage at any point. Use of the same continuous feed chain to make up both feed stretches is made possible by deflecting the chain between them around a sprocket offset from the line of feed.

Additional features reside in the sorting means including a photoelectrically controlled diverter including a tilting diverter gate located at the junction of an infeed conveyor and respective means forming three output or diversion paths selected by controlled tilting of the diverter gate. One output represents a rejection chute into which prints marked for rejection (i.e., from unprintable negatives) are diverted. A second output is represented by an offbear conveyor feeding into a first compartment of the storing loader to receive acceptable prints. The third output is defined by an offbear conveyor leading into a second storage compartment of the loader intended to receive makeover prints the negatives of which are deemed usable but the printing of which requires special attention from the processor. Control of the gate photoelectrically is effected by applying to one margin of the print a red mark signifying, for example, a reject (e.g., red is used to distinguish from any of the green, black or blue marks customarily used in conventional print cutting machines). To continue the example, a red mark placed on the opposite margin of the print signifies a makeover, whereas no red marking applied to either margin signifies an acceptable print.

In order to insure that the diverting sorter system does not respond to anything but the applied red marks, the invention further includes differentially connected green- (or other color) sensitive and red-sensitive photocells in the sorting photosensors working on the respective print margins. Mark signal memory circuits are used to store the mark signals correctly for the respective prints without regard to variations experienced in the exact positioning of the marks along the associated prints with the inspector applying the marks quickly "by hand." Timely utilization of the remembered mark signals in a decision circuit is insured by controlling the diverter gate therefrom in timed relation to the advance of the prints themselves to the diverter gate, such timing being controlled by a separate photosensor positionally related to the gate.

A pricing computer connected to be responsive to the passage of each print to the diverter and to be disabled by the presence of a reject mark signal tallies only the good and makeover prints in making up the price to the customer.

These and other features, objects and advantages of the invention will become fully evident from the following description by reference to the accompanying drawings.

DRAWINGS

FIG. 1 is a simplified plan view, and FIG. 2 a simplified isometric view of the packing machine with parts broken away to clarify the showing.

FIG. 3 recreates a portion of FIG. 1 and shows operation of carrier feed mechanism for severing a section of carrier after the same has been loaded with prints and negatives.

FIG. 4 is a simplified side elevation showing the action depicted in FIG. 3.

FIG. 5 is a simplified and elevation showing parts of the mechanism depicted in FIGS. 3 and 4 and associated means for disengaging the severed loaded carrier section from the feed mechanism.

FIG. 6 is a sectional end elevation view of the packing machine taken on line 6—6 in FIG. 1.

FIG. 7 is a sectional side elevation view of the machine taken on line 7—7 to show the print feed and sorting diverter mechanism.

FIGS. 8 and 9 view recreating similar portions of the print feed and sorting diverter mechanisms in different operating positions of the diverter.

FIG. 10 is a sectional elevation taken on line 10—10 in FIG. 1 showing the carrier feed and guide mechanism at the carrier loading station and the associated reciprocating loader.

Figure 11:
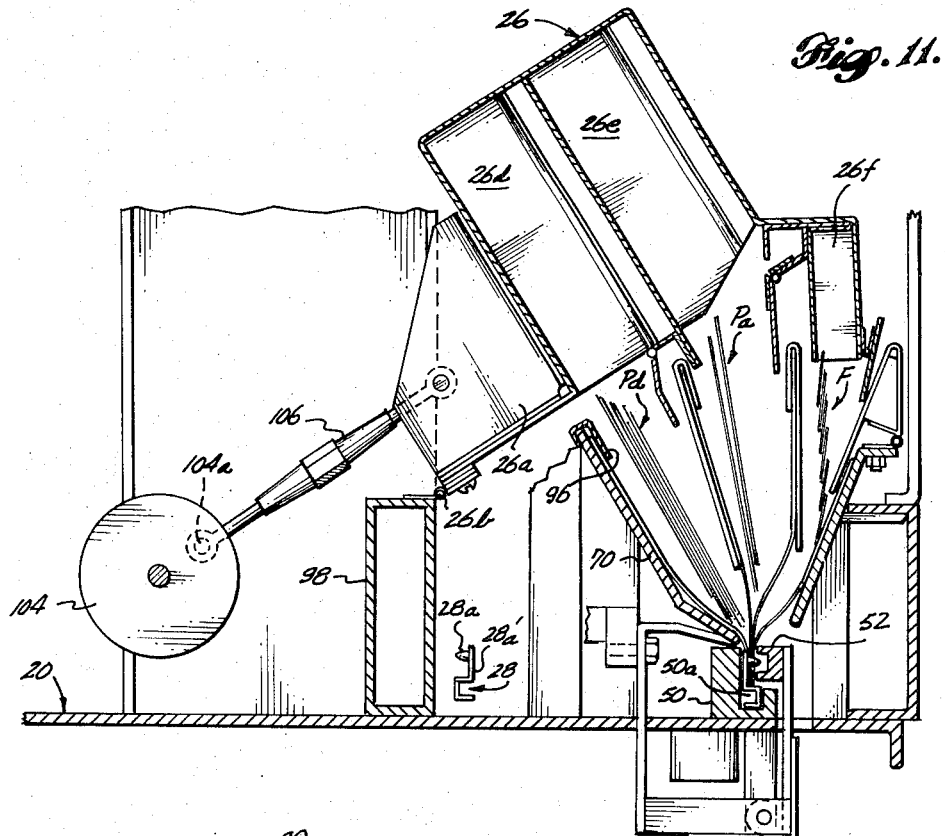

FIG. 11 is a partial recreation of FIG. 10 to show the reciprocating loader in the act of loading a carrier section with cut prints and negatives.

Figure 12:
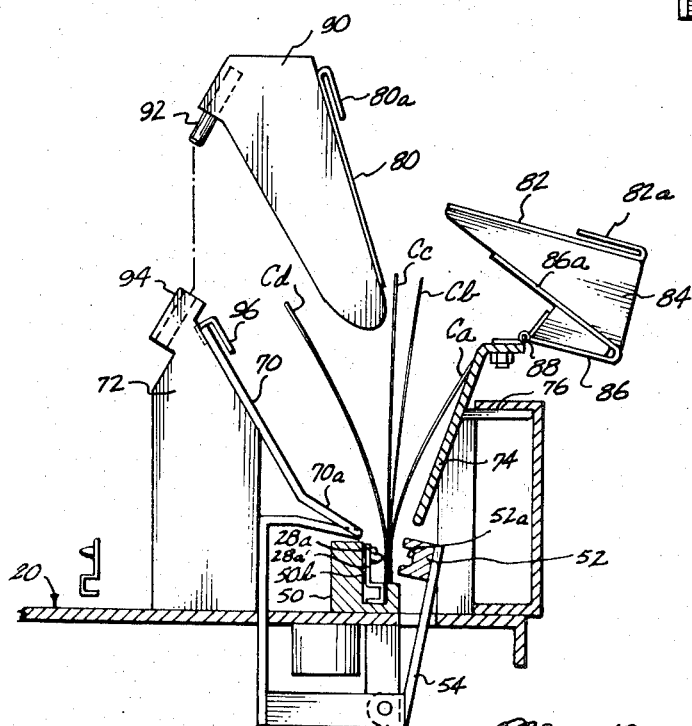

FIG. 12 is a partial recreation of FIG. 10 showing the carrier guide and feed mechanism parts opened up preparatory to inserting and engaging the strip carrier therein.

Figures 13, 14:
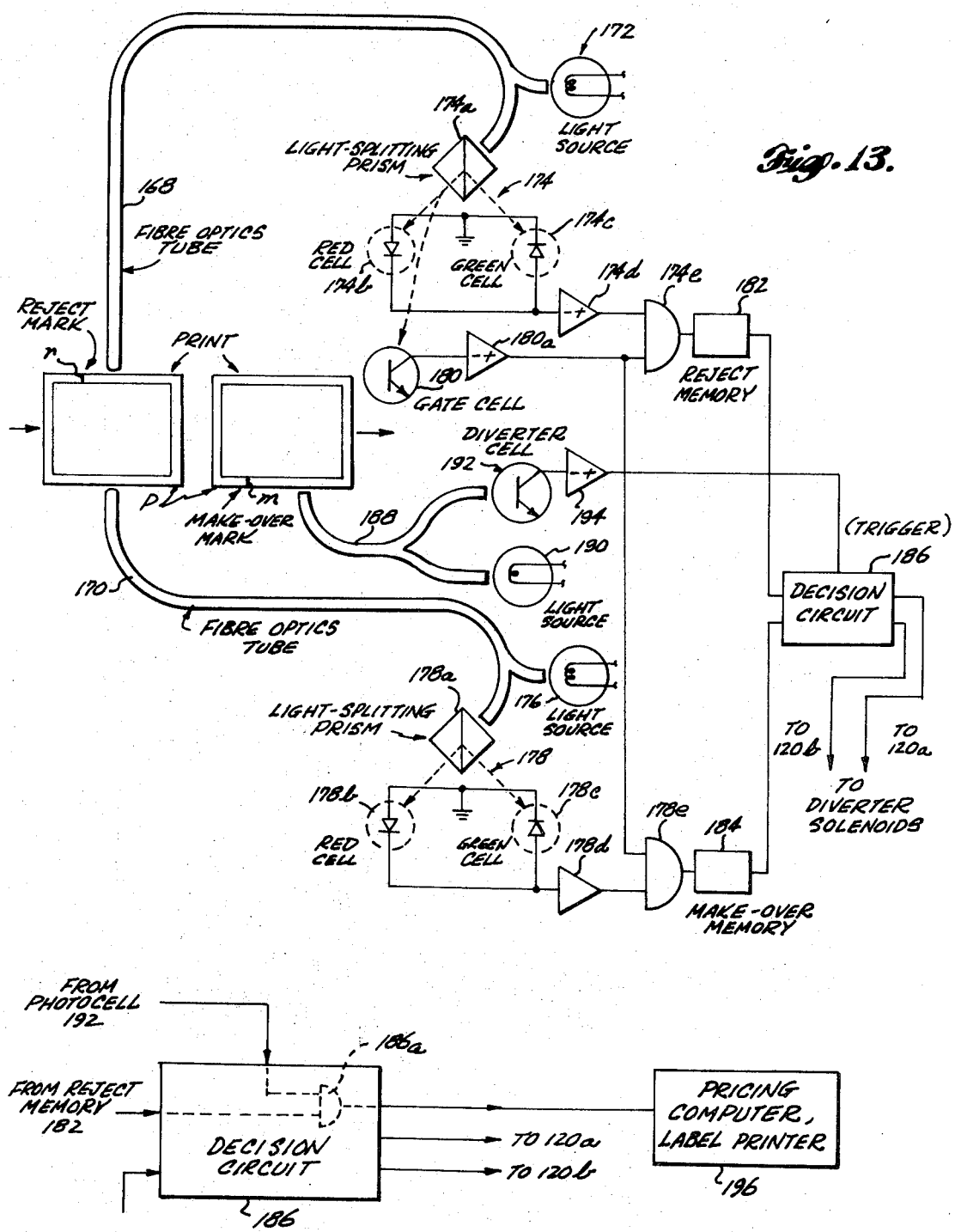

FIG. 13 is a schematic diagram of part of the photoelectric sorting control system for the packing machine.

FIG. 14 is a schematic diagram of a pricing computer and label printer associated with and controlled by the sorting control system shown in FIG. 13.

DETAILED DESCRIPTION

In FIG. 1 the illustrated machine frame and housing 20 at one end is designed to accept and mount a photographic print cutter machine K1 such as one of the 5k series machines of Eastman Kodak Company. Near its opposite end the machine frame 20 accepts and mounts a photographic film cutter machine F1 such as a Model C "Quadricutter" of Byers Photo Equipment Co., Portland, Oregon. Adjacent the latter end of machine frame 20 is a supply bin 22 for a multi-leaved strip carrier stock C. The carrier stock, stored accordion-folded, is drawn by a feed chain, to be described, out of the bin through a guide 24 on its path to a loading station S. At the loading station, cut photographic films F from machine F1 and associated prints P from machine K1, temporarily accumulated in the compartments of a reciprocating loader and making up one customer's order, are simultaneously deposited by the loader into selected spaces between leaves of a length section CS1 of carrier C. As disclosed in copending application Ser. No. 120,551, filed Mar. 3, 1971 by Leonard H. Tall and Arlen J. Erickson entitled PROCESSOR'S METHOD AND APPARATUS FOR PACKING PHOTOGRAPHS, AND CARRIER MEANS USED THEREIN, the carrier stock C preferably comprises elongated strips or leaves $C_a$, $C_b$, $C_d$, $C_e$ of paper-like material interjoined at one longitudinal edge and having transverse longitudinally spaced lines of weakening to enable severing successive carrier-length sections CS1, CS2, etc., of the carrier stock by a pulling action producing tearing. The individual sections then serve as individual customer order print and film carriers. Longitudinally spaced holes $C_h$ extending in series along the interjoined edge of the carrier are engageable by drive pins 28a of stretches of an endless chain 28 comprising the carrier drive and tearing mechanism yet to be described.

In its path of advance through and beyond the loading station the carrier stock C is guided horizontally in a generally upright position lengthwise of the machine. Guide 24 turns the stock initially into its longitudinal vertical feed plane with the drive pin holes $C_h$ at the bottom to be engaged positively by the pins of feed chain 28. The carrier stock first engages the longitudinal chain stretch 28b and thereafter the stretch 28c which is aligned with the first stretch. The first of these feed stretches is defined by an adjustable take-up sprocket 30 at the head end, and a corner sprocket 32. The second feed stretch is defined by the longitudinally spaced sprockets 34 and 36 aligned with sprocket 32. Between sprockets 32 and 34 the chain path is deflected around a sprocket 38 offset inwardly from the chain feed stretches. The back stretch of endless chain 28 is guided around adjustable sprocket 30 and the oppositely situated corner sprocket 40.

Sprockets 34 and 36 carrying chain feed stretch 28c are mounted on a longitudinally reciprocative horizontal support bar 42 which in turn is supported on corresponding ends of parallel transverse links 44 and 46 pivoted on the machine frame 20 at their opposite ends to form a parallelogram linkage. Pivotal movement of links 44 and 46 moves the chain stretch 28c longitudinally toward and from the first chain feed stretch 28b (i.e., between the positions shown in FIGS. 1 and 3, respectively). Through actuation and control arrangements to be described, the chain stretch 28c is normally positioned as in FIG. 1, in its position nearest the stretch 28b, while carrier stock is being fed so as to advance the next carrier-length section to be loaded, such as CS2, to the loading station S still engaged by chain feed stretch 28b. Carrier-length section CS1, previously loaded at station S is then being advanced beyond station S and beyond engagement with the first chain feed stretch 28b into similar positive engagement with the second chain feed stretch 28c. As carrier-length section CS2 reaches station S carrier-length section CS1 reaches which may be termed a "detachment position" D (FIG. 3) wherein the transverse score line weakening the stock between sections CS1 and CS2 lies in the chain gap intermediate the feed stretches 28b and 28 c. At that point, abrupt longitudinal shifting of support bar 42 for the chain stretch 28c away from stretch 28b exerts tension in the carrier stock adjacent the lower edge thereof and initiates the tearing action, which is completed in a split-second as the feed stretches move apart. This severs the loaded section CS1 from the next section CS2 and thereby from the body of carrier stock (FIG. 3). Note that both chain stretches have a number of positive points of engagement with the stock material on the respective opposite sides of the line of tearing, so as to assure positive separation of the sections and avoidance of stock damage. Moreover, the prints and negatives are protected since they are not contacted. The tearing action does not materially shift the items in the severed section CS1, the latter's motion to effect the tearing being a stroke of only a fraction of an inch.

Such actuation of the support bar 42 is effected by an arm extension 46a of link 46 carrying a follower roller 46b which rides on a driven cam 48. The latter is generally of circular form except for a protuberance 48a that effects the abrupt severance motion once every cycle of cam rotation by rocking the link abruptly counterclockwise through the few degrees of motion necessary to tear off the carrier section CS1. The chain itself does not inhibit this tearing action effected by relative operation of the feed stretches 28b and 28c because the sprockets 34 and 36 are idlers and the deflected chain stretch 28d between sprockets 38 and 34 is generally parallel to link 44 and of the same order of length. Likewise sprockets 36 and 40 are spaced apart on a line approximately parallel to the link 46 and of the same order of length as this link.

Also associated with the respective first and second chain feed stretches 28b and 28c are guide means for assuring continued positive engagement of the chain pins 28a in the carrier stock holes $C_h$ and finally for pushing the loaded and severed carrier sections, such as CS1, out of such pin engagement for removal from the packing machine. Such removal is here intended to be by the hand of an operator, but it could also be mechanized if desired. The chain 28 is specially formed to cooperate in these functions. As will be seen in FIGS. 2, 4, 11 and 12, for example, the chain consists of a bicycle-type chain with alternate links supporting tabs 28a' which stand up from the outer peripheral edge of the chain body plane and at their upper ends carry the carrier drive pins projecting outwardly from the tab in a direction parallel to such plane. Along most of its straight stretch 28b the chain body is positionally held and guided in the trough on groove 50a of a stationary guide 50 having a high back side wall 50b slidably backing the upstanding pin support tabs 28a' (FIG. 12). The lower edge of carrier stock C, having holes to engage the chain pins 28a, is threaded into this guide means and the spreader guides initially as shown in FIG. 12. During this time a cover guide 52 with an open channel 52a facing and accommodating the chain pins 28a is retracted on its pivoted support arm 54 from the chain (FIG. 12). With the carrier stock holes and chain pins meshed, cover guide 52 is swung closed against the chain and is held there by a locking cam 56 (FIG. 2) pivoted on machine frame 20. The channel sides of cover guide 52 pressing the carrier stock against pin tabs 28a' provide reliable assurance that the stock cannot be pulled off or slip off the chain drive pins, such as during the carrier section detachment stroke of chain stretch 28c.

Down the feed path from guides 50 and 52 the chain 28 and the carrier stock C encounter a guide frame 57 which includes plate means 58 forming a backing guide edge 58a which extends substantially the length of chain drive stretch 28c and slidably bears against the back side of the carrier stock C just above the line of drive pin holes therein (FIGS. 5 and 6). In addition the guide frame 57 includes a grooved cover guide 60, the groove 60a of which accommodates the chain pins 28a. As in the case of cover guide 52, guide 60 is also supported on a pivoted arm 57a to advance against and retract from the carrier stock C. The entire guide frame 57 including arm 57a pivots on a longitudinal support shaft 62, so that as the cover guide 60 is retracted from its operating position slidably clamping the cover stock against the chain pin tabs and guide edge 58a, the latter edge as part of top plate 58 advances against the back side of the stock to forcibly push it off the chain drive pins 28a. An actuator rod 64 is normally pushed forward by a compression spring 66 to disengage the carrier stock from the chain pins (FIG. 5). However, whenever the chain is in motion the solenoid 68 pulls the rod 64 and guide 60 so as to force the carrier stock into engagement with the chain pins, as in FIG. 1.

In the process of feeding and guiding the carrier stock C to and beyond the loading station S it is necessary first to spread and then to reclose the leaves of the carrier stock. FIGS. 10, 11 and 12 particularly illustrate the means for spreading of the leaves at the loading station in order to accommodate cut prints and negatives to be thrust downwardly into the spaces between them. In the example the carrier stock has four leaves forming three storage spaces, the one between leaves Ca and Cb being used for cut negatives, the one between leaves Cb and Cc for makeover prints that need redoing before delivery to the customer, and the one between leaves Cc and Cd for acceptable prints.

Just after the carrier stock enters the guides 50 and 52 wherein it is being held and fed positively by the drive chain stretch 28c the carrier stock leaves pass through and are separated by spreader guide means to form upwardly open V-shaped receiving troughs for the prints and negatives. On the inboard side the guide means comprises a sloping side panel 70, the lower portion of which breaks to a shallower slope than its major, upper portion. This panel near its leading end is supported on an upright standard and along its length is secured to the machine frame in any suitable manner to achieve positional stability. Opposite from the panel 70 and diverging upwardly therefrom at an opposite slope angle is outer guide panel 74 appropriately supported on an upright standard 76 and box frame 78. These two longitudinally extending guide panels 70 and 74 form an open V-shaped trough beneath the open bottom of which the feed chain and associated carrier guide means are located.

Inboard guide panel 70 extends longitudinally beyond loading station S and in so doing assumes a progressively more vertical slope to reclose the carrier stock after it passes the loading station. Guide panel 74 extends full length along the chain stretches but is of reduced height at the final station of the carrier to facilitate grasping of the carrier by hand. Outer leaves Cd and Ca lie slidably against these two panels at the loading station S. As shown in FIG. 10, leaf Cc lies slidably against the panel 80 sloped at a similar but steeper angle than panel 70, and leaf Cb lies slidably against panel 82 disposed nearly vertical. Panel 80 has an upper marginal portion 80a turned back parallel to the panel to form a deep edge-retaining groove by which to guide the carrier leaf Cc received therein and prevent it from curling away from panel 80. Panel 82 likewise has a reversely bent upper edge portion performing a like guidance function for the edge of carrier leaf Cb received therein, as does panel 70 for the edge of leaf Cd.

Panel 82 is mounted on end panels 84 joined by a V-shaped longitudinally extending panel structure 86 which is hinged at 88 to the upper edge of guide panel 74. Panel structure 86 has a panel section 86a which lies parallel to and is spaced from guide panel 74 with the panel 82 swung downward from its retracted (carrier threading) position in FIG. 12 to its operative guiding position in FIG. 10. Thus panel section 86a cooperates with the upper portion of panel 74 as an edge retainer for carrier leaf Ca preventing the leaf curling away from panel 74.

Panel 80 is supported on a block-like support member 90 having mounting pins 92 which are removably fitted in the sockets 94 mounted at the upper edge of standard 72. Thus each leaf of carrier C passing through the guide means has its upper edge protectively shielded so that downwardly thrust prints and negatives from the loader 26 cannot catch the edge of the leaf and crumple it transversely or slip past the leaf into an adjacent compartment space or outside the carrier altogether. Removal of support 90 and with it panels 80 is effected as in FIG. 12 simply by lifting the structure so as to dislodge the pins 92 from socket 94.

The loader 26 accumulates the prints and negatives of an individual customer's order in stacked groups before they are simultaneously deposited into a sectional length of carrier stock. The loader comprises a multi-sectioned box-like structure having its sections or compartments generally horizontally disposed, one above another. Each has a top and bottom wall, an open side facing the carrier loading station and openings at one end to receive infed negatives and prints, respectively. In the illustration the loader is mounted on a frame 26a hinged at 26b on a longitudinally extending edge of box frame member 98 at a level well above the plane of carrier feed chain 28. The longitudinally extending hinge 26b lies generally beneath the open or discharge side of the loader 26, that is the side adjacent the carrier stock guides. The loader's lower compartment 26d is intended to receive satisfactory prints Pa. Above the compartment 26d is a compartment 26e intended to receive makeover prints Pd requiring redoing. Extending along the top of the latter compartment is a cut film receiving compartment 26f which is mounted on the loader preferably with a slight downward initial slope in the direction toward the carrier stock, with the loader retracted upright in receiving position as in FIG. 10. A hinged spring-loaded door 26f, pivoted intermediate its top and bottom edges, is normally held shut with the loader retracted and closes the open discharge side of the film compartment 26f. Hinged doors 26d' and 26e' normally hanging shut close the discharge sides of the respective compartments 26d and 26e. These doors retain the prints and negatives in their respective compartments against accidental spill-out during filling of the loader. When the filled loader is swung downward to the discharge position shown in FIG. 11, the compartment doors swing open allowing the prints and negatives in the compartments to drop freely into the awaiting carrier spaces. One or more of the doors, such as the door 26f, slams abruptly to an open position against the loader and helps jar the prints and negatives loose in case they tend to stick in the compartments before the discharge stroke of the loader is completed.

A hinged hood 97, preferably transparent to permit visual inspection, may be lowered as a dust cover for the carrier guide means and feed mechanism.

Actuation of the loader 26 between upright receiving position (FIG. 10) and depressed loading or discharge position (FIG. 11) is effected by an eccentric drive or crank including motor 100, gear drive 102, including solenoid clutch 102a, crank support disk 104 having crank pin 104a and connecting rod 106 pivotally connected to the loader support frame 26a. Downward motion of the prints edgewise in the loader at the lower end of the arc of swing shifts the prints from horizontal to vertical position, and in following their arc of travel some centrifugal force is experienced causing them to lift off the initial supporting floors of their respective compartments. This helps against sticking. As the downwardly moving loader decelerates in cresting its simple harmonic discharge-return cycle, the prints continue to move downward at their previous greater speed by momentum and thereby are thrust, with the further help of gravity, fully down into the narrowly reentrant receiving pockets of the awaiting carrier. Thus the prints and negatives are fully and reliably inserted into the carrier by the combined effects described despite their curling tendencies, any proneness to stick and similar factors making them difficult to transfer reliably from one holder to another merely by motion of one of the holders. To the extent centrifugal force may crowd them together during the discharge stroke of the loader, and flatten them out a bit more, it may also assist in that way in effecting their deeper insertion into the narrowing bottoms of the carrier pockets.

As shown in FIGS. 7–9, cut films F are not sorted as they are fed directly into the loader compartment 26f from cutter F1. This feed is from one direction. Prints P are fed from cutter K1 and move in the opposite direction. Cutter K1 referred to has a photocell that senses cutting control marks (black, blue or green) placed across one longitudinal edge of a strip of prints stored in the print cutter so as to sever the individual prints at the correct locations and feed them on to the packing machine. An end-of-order mark (usually also black, blue or green) placed across the opposite longitudinal margin of the print strip is detected by a separate photocell in such cutter to signal cutting of the last print of a particular customer order. Suitable means in the film cutter F1 also provides an end-of-order signal. End-of-order signals from both cutters F1 and K1 must occur, of course, to assure feed of all prints and films of a customer's order to loader 26 before the latter is enabled to dump its contents into carrier C. A simple locking or enabling circuit of suitable or known form not shown herein either actuates the loader or enables it to be actuated manually or by other means.

In the packing machine the received prints to be sorted have been previously marked by an inspector according to quality while the prints are still on a continuous roll and before they start through cutter K1. The inspector marks a print herein with a red transverse line across one longitudinal margin to signify a reject if the negative was unusable from which the print was made. The inspector applies a red transverse line across the opposite longitudinal margin of a print that is itself unacceptable but was deemed to have been made from a negative which is nevertheless printable by special handling. Normal, acceptable prints up to quality standards are unmarked. The manner of sensing these marks and controlling the sorting will be described after first discussing the conveyor and sorting mechanism in the machine. First the infed prints from cutter K1 arrive on a rubber multi-belt conveyor 108, the far-end drum of which, 108a, overlies the upper receiving end of a reject chute 110. Overlying the drum 108a is the infeed guide drum 112a of a longitudinally extending second rubber multibelt conveyor 112. Third, fourth and fifth somewhat similar conveyors 114, 116 and 118 successively underlie conveyor 112. The top stretch of belts of conveyor 114 cooperates with the bottom stretch of belts of conveyor 112 to define between them a feed path for makeover prints which the inspector has marked. Accordingly, makeover prints are saved and packed in a separate compartment for identification and printing from the related film. The pivoted diverter gate 120 in its most counterclockwise position (FIG. 8) guides such prints from conveyor 108 into such first path and thereupon into the upper loader compartment 26e.

Reject prints inspector-marked are directed by diverter gate 120 in its most clockwise position (FIG. 9) down into the reject chute 110 for wastage disposal.

The acceptable prints are directed by diverter 120 in its intermediately disposed angular position (FIG. 7) into the nip between conveyors 116 and 118 leading to the lower loader compartment 26d.

Solenoids 120a and 120b are connected through links 120c and 120d to the ends of a drive arm 120e mounted on the diverter gate. Springs 120f and 120g hold the diverter gate normally in its mid-position (FIG. 7). However, actuation of one solenoid or the other moves the diverter toward one of its alternate positions (FIGS. 8, 9). To drive the conveyors, belt 124 driven by motor 122 turns the shaft 132a of pulley 132 and through gear 134 thereon (FIG. 2), the successively meshed gears 136, 138 and 140, the latter two turning the drums 114b and 112b (FIG. 7) of conveyors 114 and 112. Infeed conveyor is turned by a belt 142 encircling a drive pulley on shaft 132a and a counterpart 108a' on the shaft of the drum 108a of conveyor 108. Sheaves 144 and 146 engaging belt 142 are used to drive pulley 116a and pulley 116b (FIG. 2). Drum 116 of a conveyor 116 is driven frictionally by the lower stretch of a belt or belts 148 deflected by drum 116a between the drums 148a and 114b encircled by belt 148.

A side guide for the conveyed prints is provided by fixed wall 161 standing upward from the frame 20. Guidance for the prints at the oppostie side is afforded by a plate 162 supported by four transverse horizontal shafts supported rotatively in side plates 161 and 166. Shafts 164 are threaded in plate 162 so as to permit adjusting its spacing from plate 161 according to the width of prints being conveyed (FIG. 6).

Motor 122, through belt 126, also drives gear reducer 128 which in turn drives sprocket 40 to run the carrier feed chain 28. In addition gear reducer 128 drives the cam 48 through spur gears 150 and 152 to actuate (i.e., release) the carrier cover guide 60 at the appropriate feed intervals corresponding to the length of carrier stock sections defined by the spacing of score lines t.

Switch means 154 is actuated by cam 156 each time the gear reducer 128 has driven the feed chain 28 through one carrier section's length of feed motion and has driven the cam 48 through the small angular increment during which the cam lobe 48a drives the follower out and back so as to tear off a section of carrier stock CS. Switch means 154 is also electrically connected to the solenoid 68 to close the cover clamp 60 during chain advance and it may also open or de-energize the magnetic clutch 130 so as to terminate drive of the carrier feed chain.

While such drive is temporarily interrupted by the operation of switch 154, operation of the motor 122 continues to drive the infeed conveyors 108, 112, etc. Also appropriate controls (not shown) responsive to end-of-order mark signals from cutters K1 and F1 permit energizing magnetic clutch 102a so as to drive the loader crank 104 and thereby dump the loader contents into the open carrier section at loading station S. As shown in FIG. 1, a switch 158 cyclically actuated by cam 160, which is rotated with the crank 104, is opened upon completion of one rotation cycle of the clamp thereupon to deactuate the magnetic clutch 102a.

The machine with its driver and operating sections thus far described by reference to FIGS. 1 through 12 is seen to require the following control inputs in order to to remain in sustained operation coordinated with the cutters F1 and K1:

a. A starting signal temporarily by-passing switch 158 so as to re-engage clutch 102a and actuate the loader 26.

This can be provided by a manually closed circuit switch to complete a clutch energizing circuit through series switches closed by the respective end-of-order signals from units K1 and F1.

b. A starting signal temporarily by-passing switch 154 so as to re-engage clutch 130 and thereby resume carrier feed motion of chain 28. This can be provided by manual control or automatically in response to completion of the stroke of actuator cam 48.

c. Diverter control signals which selectively energize solenoids 120a and 120b in response to information memorized from sensing the quality grading marks inspector-applied to the prints being fed to conveyor 108, and a trigger pulse from a separate photosensor or other device for timing diverter actuation just ahead of the print's arrival there.

That portion of the total control system depicted in FIG. 13 will now be described keeping in mind that the control sequence and the elements which operate therein are essentially "in line" with the commercially available print cutter K1 shown at the left in FIG. 1. In the latter a continuous long roll of print paper carries in one series after another thereon the prints of different customer orders. On one side margin of the roll at a certain point along each print's "frame" a transverse mark is made by the printer (not shown), usually green, blue or black, thereby to energize a red-sensitive photocell at the proper time to operate a cutter in the machine K1 so as to sever each print from the roll by cutting exactly midway between successive prints. On its opposite side margin a transverse green, blue or black mark is similarly made on the print strip at longer intervals and at precise locations corresponding to the ends of the print series making up successive customer orders. These latter marks are also photoelectrically sensed in the machine K1 as previously stated and are used to stop the machine K1, subject to later restarting. Manual or mechanized restarting techniques available for the purpose have already been mentioned.

In accordance with this invention, while the prints thus premarked are still on a continuous roll, and before they are run through the cutter K1, the prints are inspected and separately marked for quality. The marking is done in such a way that it will not deceive or misactuate the cutter and end-of-order sensors operating in machine K1. Moreover such marking should be such as to be photoelectrically distinguishable from the cut and end-of-order marks. It should be done simply and quickly by the inspector, without undue care being required in the exact placement of the mark. For these reasons color, such as red, is used as the basis of distinction and a simple line mark is chosen as the form of the mark used.

Thus the inspector may apply to one border of a hopeless print a red line mark "r" to indicate a reject print that should not have been printed at all (i.e., camera out of focus, camera moved, excessively overexposed or underexposed, etc.). By means to be described this mark "r" assures that the machine will not package that print and also that the customer will not be charged for it in his bill. The inspector may apply to the opposite border of a defective print made from a usable negative a similar red line mark "m" to assure that the machine saves but segregates this print from the acceptable ones, so that it may be later recognized for makeover purposes, also that the customer will be charged for the final print when an acceptable one is made from the retained negative. The inspector need not, and in the example does not, mark acceptable prints. They are usually in the vast majority. Hence marking only the reject or makeover prints simplifies his job greatly.

The roll of inspected and marked prints is then placed in the print cutter machine K1 at one end of the packer machine, while the film cutter receives a corresponding roll of the film from which the prints were made and which is available, if necessary, as a reference in grading and marking reject and makeover prints.

Commercially available cutters K1 typically use cadmium sulfide photocells (such as Clairex Model CL903) that are sensitive in the near infrared region to sense a green, blue or black mark and produce a cutting or end-of-order response. Cells of this type are relatively insensitive to the applied red "r" and "m" marks applied by the inspector and therefore ignore these marks.

In order to sense the red "r" and "m" marks, cut prints P shown moving into the detector apparatus appearing in FIG. 13, first pass fiber-optic rod bundles 168 and 170 respectively trained on the opposite borders of the prints. Some of the rods in bundle 168 transmit light from source 172 to illuminate an area on the print margin. A narrow transverse line of this reflected light from the paper P is picked up by the remaining rods in bundles 168 and transmitted by them to a detector 174. Rod bundle 170 also has rods which transmit light to the opposite print border from a source 176 and other rods arranged to detect light reflected from a narrow transverse line across the print border and carry this light to the detector 178. The detectors 174 and 178 are similar; hence only detector 174 need be described. They are designed to sense the red line marks as reflected light interruptions. They are also capable of ignoring all other causes of light reflection or interruptions and variations in light under the fiber-optic rods.

Detector 174 includes a light-splitting prism 174a which directs the reflected light into two photo-voltaic photocells 174b and 174c, the first selectively filtered to receive only predominantly red light and the second selectively filtered to receive only predominantly some other, such as green, light. The two cells are differentially connected (i.e., with opposed polarities) between a point of reference potential (i.e., ground) and the input of detector amplifier 174d. The latter's output is applied to one input of a summing circuit 174e. Detector 178 has similar components bearing corresponding reference numerals.

Each detector 174 and 178 produces an output impulse capable of utilization in its summing circuit 174a or 178a only in response to passage of a red mark on the moving paper. This is true because the polarity of the red-sensing cells 174b and 178b is such as to pass the respective amplifiers 174d and 178d. A green mark fails to energize either of cells 174b and 178b, and while it may energize one of cells 174c or 178c, polarity from the energized cell is such as to produce no response from the related amplifier 174e or 178e. Reflected white light from the paper has all colors, of course, so that it applies both red and green light components to the respective color selective cells in each detector. However, the differential connection of these cells, balanced equally against each other as by degree of filtering or other suitable technique, assures that their outputs from white light reflection nullify each other in the inputs of the respective amplifiers 174e and 178e. Moreover, any transient or sustained effect occasioned by total interruption of reflected light (that is, when no print lies beneath the scanning ends of the fiber-optic bundles) likewise has an equal and mutually nullifying effect in the responses of the opposed cells and produces no output from the amplifiers. Therefore, red marks and only red marks applied to the print paper borders are sensed to produce output from the respective detectors 174 and 178. This discriminatory detection system is therefore compatible with that used in commercially available print cutters acting on green, blue or black marks to control cutting and end-of-order response, because it will ignore the latter marks altogether.

Now in order to utilize the signals derived in amplifiers 174d and 178d from applied reject marks "r" and makeover marks "m" to control the diverter 120, a gating function and a memory function are employed. A main purpose of the memory function has already been described. The gating or stepping function is performed by projecting onto a fifth photo-voltaic cell 180 some of the reflected light received back from the passage of a print P beneath the scanning end of a fiber-optic bundle, such as 168. The gating function's purposes will now be made evident.

Photocell 180 has an output amplifier 180a connected to a secondary input of each adding circuit 174e and 178e. As reflected light from a passing print P produces response in cell 180, circuits 174e and 178e are gated to a state responsive to signals from detectors 174 and 178, and the reject memory circuit 182 and makeover memory circuit 184 are reset, along with decision circuit 186. Thereafter, when a reject or makeover signal comes through, it passes the appropriate circuit 174e or 178e and is held in the associated memory circuit 182 or 184. When the print finally passes the scanning end of bundle 168 the resulting transient from photcell 180 operates on the memory circuit to shift any signal stored in one or the other to a second holding stage in such memory circuit.

The print next encounters the scanning end of a fiber-optic bundle 188, positionally related to the location of diverter 120 in the feed path of on-coming prints. Light from source 190 passing through rods of this bundle is reflected from the print and detected in photocell 192 having an output amplifier 194 connected to trigger the decision circuit 186 at the proper instant and for the proper period of time to actute one or the other of diverter control relays 120a or 120b. These are or may be short-term holding relays that drop out automatically at a given time after initial energization. Neither such relay will be actuated, of course, if the print passing the diverter is acceptable, i.e., bears no red reject or makeover marks. However, one or the other such relay is energized by such triggering of the decision circuit depending upon which of the memory circuits presented the decision circuit with a remembered mark signal.

In FIG. 14 pulses from the diverter control photocell 192 coming to the decision circuit 186 are passed to a gate therein, one for each print that passes the fiber-optic scanner 188. Moreover, in the absence of a remembered reject signal from memory circuit 182 also passed to the gate 186a the gate passes this print-registering impulse to the pricing computer 196. Preferably computer 196 is similar to the "CX 101" produced by CX Processing Laboratories, Inc., of Seattle, Washington. If there was a remembered reject signal from memory 182 associated with the print passage signal, the latter is cut off by the gate 186a and is never counted in the pricing circuit. Therefore, those and only those print passage impulses which correspond with acceptable prints and makeover prints are counted. The total count is multiplied in the computer by a preset price per print in the pricing computer to obtain a net price which is usually printed on a sticker label. The label may be applied mechanically to the loaded carrier issuing from the packing machine or may be merely presented to a human operator who applies it to the loaded carrier in taking it from the machine and inserting it into a customer delivery envelope, or to the envelope itself. The customer order is thus not charged for reject prints, but is charged for makeover prints even though the makeover printing is to be done later.

We claim:

1. Apparatus for feeding lengthwise and tearing into sections an elongated strip of paper-like stock having transverse lines of weakening between such sections and a series of holes extending along one longitudinal edge of the stock, said apparatus comprising an elongated feed chain having a series of pins extending along one side thereof adapted to engage successive holes in the stock, said chain having a first stretch, a second stretch generally aligned with the first stretch and a bend portion intermediate the first and second stretches deflected out of alignment therewith in a bend formation, and means operable to effect abrupt relative separation between the chain stretches in order thereby to tear from the body of stock a section having holes which are engaged by the first stretch of chain from a section of stock having holes which are simultaneously engaged by the second stretch of chain.

2. Apparatus for feeding lengthwise and tearing into sections an elongated strip of paper-like stock having transverse lines of weakening between such sections and a series of holes extending along one longitudinal edge of the stock, said apparatus comprising a first feed means extending along a first portion of the stock and having a plurality of elements in series arrangement simultaneously engaging corresponding holes in said first portion of the stock, a second feed means extending along a second portion of the stock and having a plurality of elements in series arrangement simultaneously engaging corresponding holes in said second portion of the stock, drive means operable on the first and second feed means to effect movement thereof conjointly in a direction lengthwise of the stock thus engaged by the elements of said first and second feed means so as to cooperatively advance the stock in a progressive lengthwise direction, and separating means coordinated with the drive means and intermittently operable on the first and second feed means to effect relative separation movement between the first and second feed means with an abruptness and degree of displacement which effects tearing off successive first portions of the stock being successively engaged by the first feed means from the remaining second portions of stock along successive lines of weakening therebetween.

* * * * *